Dec. 29, 1970 K. ROCHLA 3,551,238
PROCESS AND APPARATUS FOR MANUFACTURING VALVED BAG
OF PLASTIC MATERIAL SHEETING
Original Filed Aug. 19, 1965 4 Sheets-Sheet 1
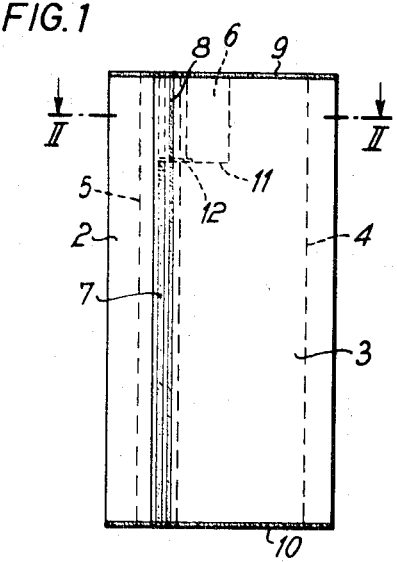
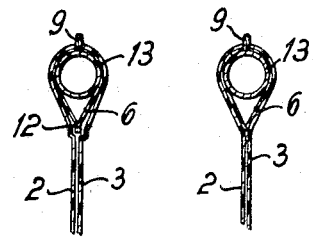
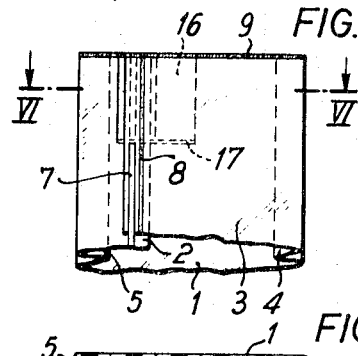
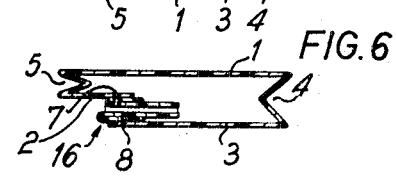
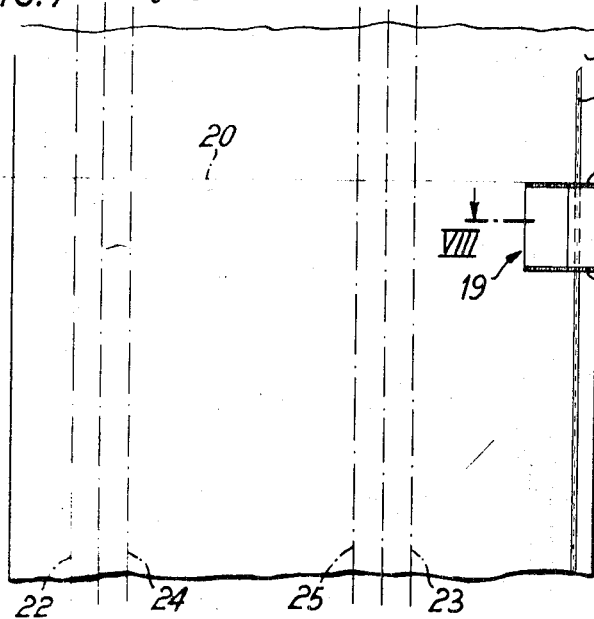
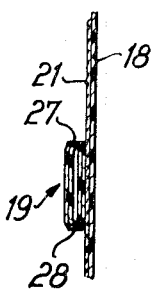
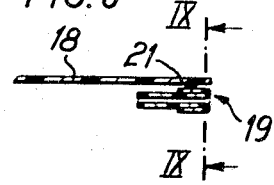
INVENTOR:
Kurt ROCHLA
BY
Stevens, Davis, Miller & Mosher
ATTORNEYS INVENTOR:
Kurt ROCHLA Dec. 29, 1970  K. ROCHLA  3,551,238
PROCESS AND APPARATUS FOR MANUFACTURING VALVED BAG
OF PLASTIC MATERIAL SHEETING
Original Filed Aug. 19, 1965  4 Sheets-Sheet 4

INVENTOR
Kurt ROCHLA

BY
Stevens, Davis, Miller & Mosher
ATTORNEYS

United States Patent Office 3,551,238
Patented Dec. 29, 1970

3,551,238
PROCESS AND APPARATUS FOR MANUFACTURING VALVED BAG OF PLASTIC MATERIAL SHEETING
Kurt Rochla, Lengerich, Germany, assignor to Windmöller & Holscher, Lengerich, Germany
Original application Aug. 19, 1965, Ser. No. 480,898. Divided and this application Jan. 5, 1968, Ser. No. 695,989
Int. Cl. B31f 1/00
U.S. Cl. 156—201            6 Claims

ABSTRACT OF THE DISCLOSURE

Process and apparatus for manufacturing a valved bag commencing with two supply rolls, each carrying a single-ply web of plastic material. The webs are fed along a fixed path along which are disposed a heat-sealing device for forming wide heat-sealed transverse seams for joining the webs at spaced locations and a device for performing cutting operations on the sealed transverse seams.

REFERENCE TO OTHER PATENT APPLICATION

This is a divisional application of my copending U.S. patent application Ser. No. 480,898, filed Aug. 19, 1965.

A gusseted and valved bag of heat-sealable material has already been disclosed, which consists of a section of a tubing of a single layer of plastic material and is closed at both ends. This tubing has been made from a web of plastic material by folding the side portions of the web inwardly and heat-sealing the overlapping edges of the side portions of the web by means of an extruded strip of plastic material which has been introduced in a hot state between said edges. The filling valve is formed by a patch of plastic material, which is laid in two plies, and which has been heat-sealed with the aid of a separate extruded strip of plastic material to that side portion of the web which is subsequently folded on top of the other. This valve is disposed in the lap seam. The initially free edges of the valve patch, which lie one over the other, are joined by the top closing seam at the top of the bag so that the finished bag has a valve sleeve which extends into the interior of the bag. The outer edge of the initially provided valve sheet has been backfolded before the heat-sealing operation so that the valve sleeve consists of two layers where the side portions of the web overlap.

This bag and the method of manufacturing it have various disadvantages, which reduce the usefulness of the bag and add to the costs of manufacture. The most important disadvantage of the bag is that its heat-sealed longitudinal seam has a critical point which often fails under the arising stresses. This weak point is that point of the lower edge of the normally flattened valve sleeve where large tension forces tending to pull the seam apart are applied, particularly when the bag is being filled and is suspended from a filling spout over which the valve sleeve has been fitted. This point is critical because it is not possible to provide a proper heat-seal between the parts at this point as the valve insert spaces the edges apart, which are elsewhere heat-sealed to each other. Even in new bags, there may be a small duct in the seam at this point, where a tearing of the bag begins under high load. This condition is aggravated by the fact that a certain expanding force acts at the folded lower edge of the valve sleeve owing to the elasticity of the plastic material and opposes the formation of a good heat-sealed seam at the critical point, particularly when the longitudinal seam is formed in a continuous operation. The same difficulties may be encountered with valved bags which are made from plastic material and in which the longitudinal seams which join the valve are not formed with the aid of a hot extruded strip of plastic material, but by the conventional flat heat-sealing process. The difficulties which have been described are encountered particularly in bags of plastic material having a seam formed with the aid of a hot extruded strip of plastic material.

It is an object of the present invention to provide improved valved bags which are made from plastic material and in which the filling valve consists of a sleeve of plastic material and lies in the heat-sealed seam, said improvement ensuring that the bags will reliably resist the stresses to be encountered. For this reason, it has been an object of the inventor to avoid the previously existing weak point.

According to the invention, this object is accomplished in that both plies of the valve sleeve are joined by a heat-sealed flat seam along its lower edeg at least adjacent to the heat-sealed longitudinal seam of the bag. This arrangement eliminates the expanding action of the edge of the valve sleeve and causes the tension forces to act on a point which does not coincide with the previously critical point in the longitudinal seam of the bag at the intersection of the longitudinal seam of the bag and the lower edge of the valve sleeve.

The use of a patch of plastic material laid in two plies as a filling valve, as was used in the bags according to the prior proposal, is undesirable in the manufacture of the bag. The folding jaws cannot grip the thin patches of plastic material so exactly that the initially forward end registers exactly with the rear end. One end is set back from the other or the two edges are not parallel if the patch is introduced at a somewhat oblique angle between the folding jaws. As a result, the bag blanks must be trimmed when plastic material patches which have been folded together are used as filling valves. This results in a considerable loss of material and adds to the cost of the bags. A further disadvantage inherent in the use of patches of plastic material which have been folded together is that the valve can be located only at the top corner which has once been selected unless the machine is rearranged to a considerable extent. This is due to the fact that in the feeding of the valve patches to the web of bag material the superimposed free ends of the valve patches must not be the leading portion. In practice, however, the use of different filling plants leads to a requirement for bags having valves at the right-hand top corner and for bags having valves at the left-hand top corner.

For this reason, it is a further object of the invention to avoid also these disadvantages of the filling valves. This is achieved in that two patches of plastic material are used as a filling valve, rather than one patch of plastic material which has been laid in two plies or folded together. These two patches are superimposed and joined by heat-sealing along two parallel sides to form a sleeve. The resulting filling valve has additional advantages over those that have been proposed before. With the filling valves according to the prior proposal, the top edge of the bag blanks severed from the tubing is interrupted because the heat-sealed top transverse seam of the bag is required for the formation of the valve sleeve. On the other end, the top edge of the bag blanks provided with the sleeve-like valve insert according to the invention is closed so that trouble due to fluttering corners will be avoided during the further processing of the bag blanks, which are transferred from conveyance in a longitudinal direction to conveyance in a transverse direction. As the valve inserts according to the invention are formed from two pieces rather than one peice, the webs of material are provided so that with the supply rolls of the same size the period after which a roll must be exchanged is virtually doubled. This promotes the output of the machine because the same must be stopped whenever a roll must be exchanged.

On the other hand, if a more frequent exchange of rolls is tolerated, the invention includes also the processing of a prefabricated web of valve sleeves which lie transversely to the longitudinal direction of said web and are joined along lines of weakness, such as transverse lines of perforations.

A further disadvantage of the previously proposed valved bag is that its valve sleeve cannot be opened as easily as is desirable. On the contrary, an operator who must fit the valve sleeve of the bag over a filling spout may fail to enter the valve opening with her fingers.

In a valve sleeve consisting of two patches of plastic material, this disadvantage may be avoided according to the invention in that the patches differ in width, or are joined by heat-sealing in a staggered relation so that the two plies of the valve sleeve are offset from each other at the outer end. That ply of the valve sleeve which faces the interior of the bag is preferably set back from the other ply so that the fingers of the operator can move more easily into the valve sleeve to open the same.

In the manufacture of the valved bags from plastic material according to the prior proposal and in the manufacture of the valved bags of plastic material which have been described hereinbefore, a trimming of the bag blanks before the formation of the closing seam extending transversely to the longitudinal direction of the bag cannot be omitted because the insertion of the valve sheet and the severing of a bag blank cannot be performed with such accuracy that the edges of the double-folded valve patch are exactly in registry with the end of the bag blank, as would be required for a joint heat-sealing of these parts. Where a patch of plastic material laid in two plies is used to form the valve sleeve, as is the case with the prior bag, this trimming is also required because the thin patches of plastic material cannot be gripped by the folding jaws so exactly that the initially forward end is exactly in registry with the rear end. On the contrary, one edge is set back from the other, or the two edges are not parallel to each other when the patch has been introduced at a somewhat oblique angle between the folding jaws.

To reduce the amount of waste produced by trimming, special steps must be taken to ensure that the valve insert is introduced to lie as exactly as possible at the end of the bag blank. Nevertheless, a large portion of the valve insert may be cut off during the further processing of the bag blank when the same is trimmed at its end provided with the valve insert. This may be due to the fact that the valve insert has been introduced rather close ot the end with the disadvantage that the valve opening in the finished bag is smaller and may be too small to be fitted with the required clearance over a filling spout of the bag-filling machine. Even when the valve can be fitted, a variation in the wdith of the valves is most undesirable in the filling operation because such variation requires special attention on the part of the operator.

For this reason, a further embodiment of the invention is based on the object of providing a valved bag of plastic material of the kind described, which bag is improved so that the need for trimming the bag is entirely eliminated, as well as the need for steps ensuring an exact relation between the valve insert and the end of the bag blank to avoid an undue trimming waste. In addition, a variation of the width of the valves need no longer be feared. According to a development of the invention, this object is accomplished in that the filling valve consists of a sleeve which is prefabricated before it is applied to the bag blank, and which is spaced from the bag closing seam provided at the filling end and extending transversely to the longitudinal direction of the bag. As the filling valve consists of a prefabricated sleeve, it need not be closed by the bag closing seam, and, for this reason, its closing edges need not be in registry with the end of the bag blank. Whereas this registry was achievable only by a joint trimming, the need for such trimming is now eliminated and, with it, the waste due to trimming and the special steps previously required to obtain a particularly exact insertion of the patch in order to reduce the waste due to trimming. As the filling valve is spaced from the bag closing seam, the filling valve cannot be inaccurately inserted so as to protrude over the bag closing edge. Such a protruding valve would lead to disturbances in the formation of the bag closing seam and to a narrowing of the valve sleeve. A variation in the width of the valves is reliably avoided by the invention, which affords the further advantage that the uniformity of the bag closing seam need no longer be interrupted by the sudden transition from two to four plies which has been joined.

That proposal of the invention which has just been described is particularly advantageous when the valve sleeve consists of two plastic material patches, which are joined by heat-sealing at their edges which extend at right angles to the heat-sealed flat seam which joins the valve in accordance with the previously discussed features of the invention. When such valve sleeves are used in the manufacture of a bag according to the invention in the design just described, a tearing of the longitudinal seam of the bag, which seam joins the valve, is avoided also at the top end of the valve opening, because the heat-sealed seam of the valve sleeve does not coincide with the longitudinal seam of the bag, whereas in the previously described modification of the bag according to the invention the expanding forces arising when the valved bag is suspended from the filling spout could act on the longitudinal seam of the bag also at the top end of the bag.

That embodiment of the valved bag according to the invention which has just been described and in which the valve sleeve is no longer joined by the upper closing seam of the bag meets also requirements of the consumers, who prefer a valve sleeve that extends freely into the interior of the bag.

The invention will now be explained with reference to illustrative embodiments shown in the drawings, in which:

FIG. 1 is an elevation showing a gusseted and valved bag according to a first embodiment of the invention in a flattened condition;

FIG. 2 is a sectional view taken on line II—II of FIG. 1;

FIG. 3 is an elevation showing the top end of the bag of FIG. 1, which has been turned through 90° and fitted on a filling spout;

FIG. 4 is a view similar to FIG. 3 and shows a gusseted and valved bag according to a prior proposal;

FIG. 5 shows in an elevation similar to FIG. 1 the top end of a second embodiment of a gusseted and valved bag;

FIG. 6 is a sectional view taken on line VI—VI of FIG. 5;

FIG. 7 is a fragmentary view showing a portion of a bag material web to which a valve sleeve according to the invention has been heat-sealed;

FIG. 8 is a sectional view taken on line VIII—VIII of FIG. 7;

FIG. 9 is a sectional view taken on line IX—IX of FIG. 8;

Figure 10:
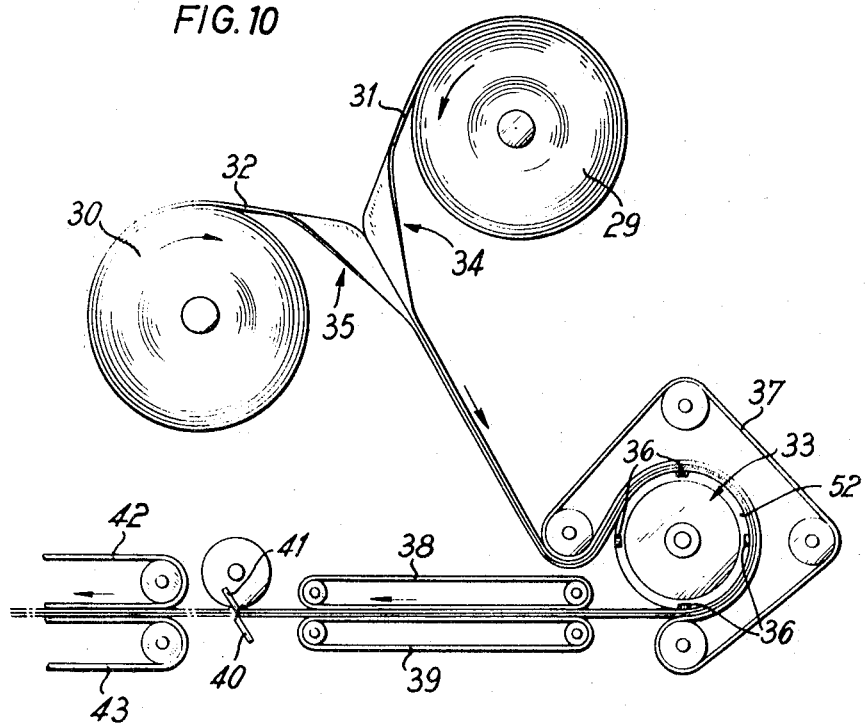
FIG. 10 is a diagrammatic view showing an apparatus for manufacturing the valve sleeves according to the invention.

The gusseted and valved bag shown in FIGS. 1 and 2 comprises a rear ply 1, a front ply composed of two portions 2 and 3, the two gussets 4 and 5, and the valve sleeve 6. A heat-sealed longitudinal seam 7 is formed in the area where the portions 2 and 3 overlap. Adjacent to the valve sleeve 6, the heat-sealed longitudinal seam 7 includes not only the portion 3 of the front ply, but also that ply of the valve sleeve which faces the interior of the bag. The other ply of the valve sleeve is joined by a separate heat-sealed seam 8 to the edge of the front ply portion 3. The top and bottom ends of the bag are closed by heat-sealed transverse seams 9 and 10. The heat-sealed transverse seam 9 joins the two plies of the valve sleeve. The starting material for making the valve sleeve is a patch of plastic material which is folded along the edge 11. The outer edge of this patch of plastic material has been back-folded outwardly before the patch has been joined by heat-sealing (see FIG. 2) so that each ply of the valve sleeve consists of two layers in the area where the portions 2 and 3 overlap.

According to the present invention, both plies of the valve sleeve 6 are joined by a heat-sealed flat seam 12 at a lower marginal strip adjacent to the overlapping edges of portions 2 and 3. FIG. 3 shows the valve sleeve 6 which lies between portions 2 and 3 of the front ply of the bag and has been fitted over a filling spout 13. The above-mentioned critical point lies at the lower edge of the valve sleeve. In the gusseted and valved bag according to the prior proposal, strong tension forces, which occur particularly during the filling of the bag, act on this point. FIG. 4 is a view similar to FIG. 3 and shows the prior bag. The heat-sealed seam 12 provided according to the invention in the novel bag ensures that the tensile forces act no longer on the critical point of the heat-sealed seam 7. A further result of the provision of the heat-sealed seam 12 is that the valve sleeve cannot exert expanding forces on the heat-sealed edges of the portions 2 and 3 of the front ply, as is the case in the prior bag.

FIGS. 5 and 6 show a gusseted and valved bag which is similar to the bag of FIGS. 1 and 2. For this reason, like reference character are used for like parts. Different from the bag described before, the double-folded patch of plastic material forming the valve sleeve 6 is replaced by a valve sleeve 16, which consists of two patches of plastic material. Before the sleeve has been heat-sealed to the bag material, these two patches have been superimposed and joined by heat-sealing along their two parallel sides. One of these heat-sealed seams has been merged with the heat-sealed transverse seam 9 during the finishing of the bag. The other heat-sealed seam 17 corresponds to the heat-sealed seam 12 of FIGS. 1 and 2 and prevents an action of the forces on the previously critical point of the heat-sealed longitudinal seam 7. As is apparent from FIGS. 2 and 6, the two layers of the inside ply of the valve sleeve are joined by heat-sealing to each other and to the portion 2 of the front ply. The two layers of the outer ply of the valve sleeve are joined by the heat-sealed seam 8 to each other and to the portion 3 of the front ply.

The starting material used in the manufacture of the bag is a plastic material web 18 (FIGS. 7 to 9) of suitable width. During the continuous advance of the web, finished valve sleeves 19 are fed according to the invention to the web and joined to it by heat-sealing at points which are spaced apart by the desired bag length. One longitudinal edge of the valve sleeve is in registry with the line where the bag is subsequently transversely severed. This line is shown in FIG. 7 as a dash-dot line 20. A hot extruded strip 21 of plastic material is continuously fed to the web 18 and serves for heat-sealing the valve sleeves to the web. This heat seal forms the seam 8 in the bags described hereinbefore. When the valve sleeves have been joined by heat-sealing, the side portions of the web are turned over so that a tubular web is formed. Those edges of the side portions of the web which overlap when the side portions have been turned over are joined by heat-sealing with the aid of an extruded strip of plastic material, which is introduced in a hot condition between these edges. The resulting longitudinal seam, which extends in the longitudinal direction of the bags, is the seam 7 of the bags described hereinbefore.

FIG. 7 shows six dash-dot lines which extend in the longitudinal direction of the web and indicate the lines where the web is subsequently folded. That portion which extends to the left from line 22 subsequently forms the portion 2 of the two-part ply of the tubing. This portion 2 is the first to be turned over. That portion which extends to the right from line 23 subsequently forms the portion 3 of this ply of the tubing. This portion is turned over after the portion 2. That portion of the web of plastic material which lies between lines 24 and 25 subsequently forms the one-part ply 1 of the tubing. Those web portions which lie between the lines 22 and 24 and the lines 23 and 25 subsequently form the gussets 4 and 5.

As finished valve sleeves 19 are joined by heat-sealing to the web 18 of plastic material, the bag blanks which have been severed from the tubing formed from the web have an uninterrupted edge to which the valve insert extends. Just as the valve sleeve 16 in FIGS. 5 and 6, the valve sleeve 19 consists also of two patches of plastic material (see particularly FIG. 8). The outer edge of each of the two patches is folded outwardly. The two patches are joined to each other by the two heat-sealed seams 27 and 28.

Figure 11:
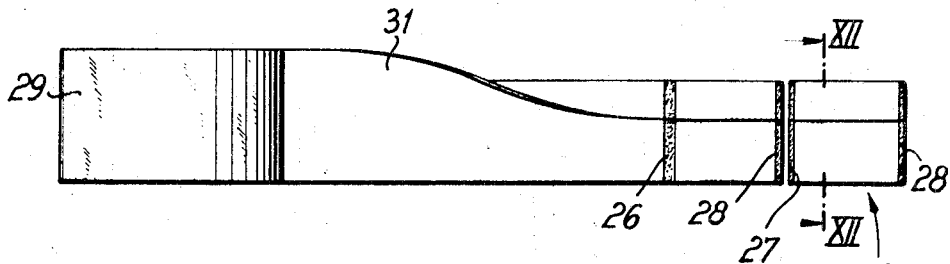
FIG. 11 shows the manufacture of a first embodiment of valve sleeves according to the invention.

FIG. 10 shows an embodiment of an apparatus for making valve sleeves 19. Two webs 31 and 32 of plastic material are continuously withdrawn from two supply rolls 29 and 30. A heat-sealing cylinder 33 serves at the same time as a feed roll. On their way toward this cylinder, the registering edges on one side of the webs are folded outwardly in diagrammatically indicated deflecting devices 34 and 35. The welding cylinder 33 has, e.g., four transverse heat-sealing stations represented by electric resistance strips 36 and is contacted around a major part of its periphery by an endless belt 37, which extends around four guide rollers. This belt is maintained under a certain tension and serves for urging the web of plastic material, consisting of two plies 31 and 32, against the heat-sealing cylinder 33. The heat-sealing cylinder is succeeded by at least one pair of belt conveyors 38/39, which move the web provided with heat-sealed transverse seams through a cooling zone to a guillotine. The guillotine comprises, e.g., a stationary lower knife 40 and a rotating upper knife 41. The guillotine severs valve sleeves from the web. These sleeves extend transversely to the longitudinal direction of the web. The transverse parting line extends through the heat-sealed transverse seam as close as possible to its center. This is shown in FIG. 11. The heat-sealed transverse seams 26 are formed while the web revolves in unison with the heat-sealing cylinder 33. By the severing of a web section, each heat-sealed transverse seam 26 is divided in its longitudinal direction so that finished valve sleeves 19 are formed, the longitudinal edges of which are formed by the heat-sealed seams 27 and 28, each of which has half the width of an original heat-sealed seam 26.

Figure 12:
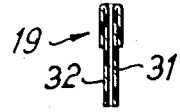
FIG. 12 is a sectional view taken on line XII—XII of FIG. 11.

FIG. 12 is a longitudinal sectional view showing a valve sleeve which has been made in the apparatus of FIG. 10. Each of the initially provided webs 31 and 32 of plastic material forms one ply of each flattened sleeve. In that end of the valve sleeve which is subsequently heat-sealed between the overlapping portions of the bag material, each ply consists of two layers because the edge strip of each web of plastic material has been folded outwardly, as has been described hereinbefore. Both plies are in registry at this end, which subsequently forms the outer end of the valve sleeve. As has been stated in the introductory part of the specification, this design has the disadvantage that an operator cannot easily open the valve sleeve when the same is to be fitted over a filling spout. The operator may initially fail to enter the valve sleeve with her fingers, which might grip beside the valve opening, as is indicated in FIG. 2.

Figure 13:
FIG. 13 is a sectional view similar to FIG. 12 and shows a second embodiment of the valve sleeves.

FIG. 13 is a longitudinal sectional view similar to FIG. 12 and shows a valve sleeve which readily enables an operator to grip into the valve opening, because the two webs of plastic material used as starting material in making these valve sleeves have different widths so that the outer ends of the two valve sleeve plies are offset. The arrangement of such valve sleeve in a bag is particularly apparent from FIG. 6.

When the valve sleeves have been severed from the web by the guillotine 40, 41 the sleeves are engaged by conveyors 42 and 43 and fed to the web 18 of bag material (FIG. 7) in a direction which is transverse to the longitudinal direction of the valve sleeve. The speed at which the valve sleeves are fed to the web corresponds to the feeding speed of the web. When it is not desired to use the valve sleeves immediately after they have been made, the guillotine 40, 41 is replaced by a perforator so that the valve sleeves are not entirely separated but can be wound up to a supply roll. The resulting supply rolls of valve sleeves are then used when desired.

Figure 14:
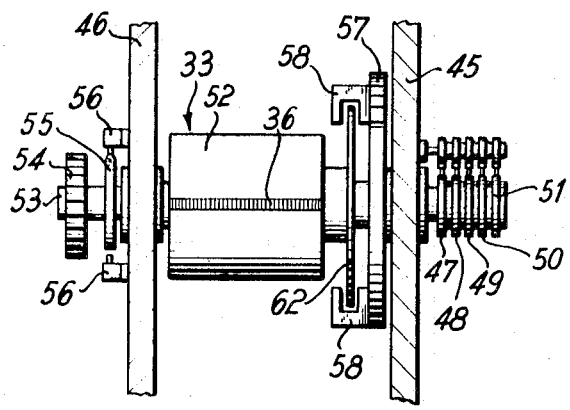
FIG. 14 shows how the heat-healing cylinder of FIG. 10 is arranged in the machine frame.

FIG. 14 is a diagrammatic view showing the heat-sealing cylinder 33 in frame parts 45 and 46 of the apparatus. The four electrical resistance strips 36 are provided with a known release agent to prevent an adherence of the web of plastic material. Current is supplied to these strips by four slip rings 47, 48, 49, and 50. The return current path for all resistance strips comprises a common slip ring 51. The heat-sealing cylinder 33 carries a shell 52 (see FIG. 10) made from a material which is electrically non-conducting and a poor heat conductor. The electrical resistance strips are mounted flush in the shell, and their spacing corresponds to the desired width of the valve sleeve. As only a few different sizes of valve sleeves are required in practice, a separate heat-sealing cylinder may be used for each size. As has been stated hereinbefore, the heat-sealing cylinder serves at the same time as a feed roll for the web which comprises the two plies 31 and 32 and is provided with transverse heat-seals. The peripheral velocity of the heat-sealing cylinder is selected so that the web is advanced in each cycle of operation of the rotating upper knife 41 by a distance which corresponds to the width of a valve sleeve. The belt conveyors 38 and 39 are driven at the same speed.

Figure 15:
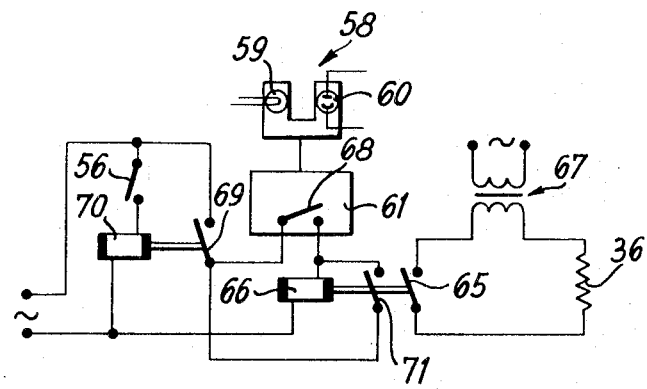
FIG. 15 is a circuit diagram of a heat-sealing station of the heat-sealing cylinder of FIG. 14.

The shaft 53 of the heat-sealing cylinder 33 carries on its one free end the slip rings and on its other free end a gear 54. Beside the gear 54, a cam wheel 55 is mounted on the shaft 53. This cam has a lobe, which successively operates four switches 56, which are evenly spaced apart and secured to the frame part 46. Only two of these switches are shown in FIG. 14. Only those two of these switches which lie in the plane of the drawing are shown in FIG. 14. In the condition shown in the drawing, the cam wheel 55 is just actuating the top switch 56. Each switch 56 serves for closing for a short time a contact in one of the four energizing circuits for slow-release relays for energizing and de-energizing the resistance strips 36. This will be described more fully hereinafter with reference to FIG. 15. A toothed segment 57 is provided on that side of the frame part 45 which faces the heat-sealing cylinder 33. This segment is pivoted on the axis of the heat-sealing cylinder and carries four light barriers 58, which are evenly spaced apart on the circumference of a circle. The light barriers are U-shaped and carry in one limb the light source 59 and in the other limb the receiver 60 (see FIG. 15). Each light barrier includes also a multiplier photocell, which is shown in FIG. 15 at 61 for one light barrier. Each light barrier controls a switch in the energizing circuit of one of four relays, as will be described more fully hereinafter with reference to FIG. 15.

Only the two light barriers 58 which lie in the plane of the drawing are shown in FIG. 14. All light barriers embrace the rim of an apertured disc 62, which rotates in unison with the heat-sealing cylinder 33. The apertured disc has a single aperture, which enables the passage of a light ray from the light source to the receiver in each light barrier for a short time during each rotation of the heat-sealing cylinder.

As the circuit arrangement is the same for each of the four heat-sealing devices, only the circuit diagram of one heat-sealing device is shown in FIG. 15. The electrical resistance strip 36 lies in a heating circuit, which includes a contact 65 of a relay 66. The heating current is supplied by a transformer 67. The above-mentioned switch 68, which is controlled by the light barrier 58, is included in the energizing circuit of the relay 66. This circuit includes also a contact 69 of a slow-release relay 70, which has already been mentioned in the description of FIG. 14. Its energizing circuit includes the switch 56. In addition to contact 65, the relay 66 has a self-holding contact 71.

If the switch 56 is closed for a short time during the passage of the lobe of the cam wheel 55, the slow-release relay 70 is operated to close the contact 69, which is not opened until the set delay time has expired. When the apertured disc passes a light ray from the light source 59 to the receiver 60, the switch 68 is also closed for a short time. As the contact 69 is also closed, relay 66 is energized and operates the contact 71 so that the relay is self-holding. The contact 65 is closed at the same time so that the resistance element 36 is energized. When the set delay time of the slow-release relay 70 has expired, contact 69 is opened to interrupt the energization of relay 66 so that the contact 65 is opened and the energization of the heating circuit is interrupted. This cycle of operation is repeated in each heat-sealing device during each revolution of the heat-sealing cylinder 33.

The slow-release relay 70 is set so that the contact 69 is closed for the maximum time required for making a heat-sealed transverse seam 26. The determination of this time is based on the assumption that the resistance strip 36 is cool at the beginning of a heat-sealing operation. After a certain period of operation, however, there is a certain amount of residual heat in the resistance strip at the beginning of a new heat-sealing operation so that this strip would be overheated if it were energized throughout the time in which the contact 69 is closed. This would result in burning of the plastic material. To avoid this, the apertured disc 62 is angularly adjustable relative to the heat-sealing cylinder 33. The movement of the apertured disc relative to the heat-sealing cylinder is automatically controlled in response to the temperature of the resistance strip. When the temperature of the resistance strip is excessive, the apertured disc 32 is turned back relative to the heat-sealing cylinder 33 so that the closing of the switch 68 is delayed by a corresponding time. The delay of the closing of switch 68 delays also the energization of the resistance strip 36. The resistance strip is de-energized when the contact 69 is opened. As a result, a delayed closing of switch 68 results in a shorter energization of the heating circuit. The residual heat is thus prevented from causing an overheating of the resistance strip.

As it is desired to process plastic materials which differ in composition and thickness, the heat-sealing time can be varied and properly selected in dependence on said variables. This is effected by an adjustment of the toothed segment 57, which carries the light barriers 58. For this purpose, the toothed segment is in mesh with a gear (not shown), which can be operated, e.g., by hand. When it is necessary to take the speed of the heat-sealing cylinder into consideration, this may be effected by a control of the toothed segment 57, e.g., in response to the centrifugal force of the rotating shaft 53.

Figure 16:
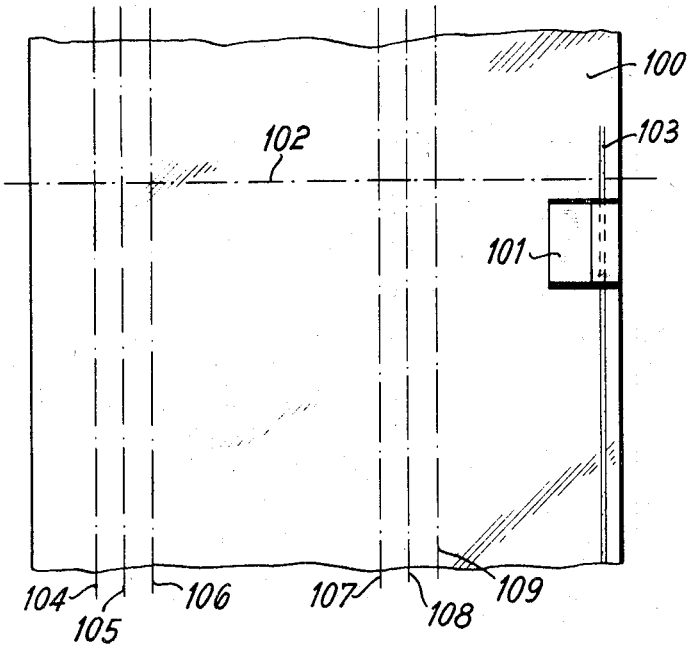
FIG. 16 is a fragmentary view showing a section of a bag material web and a valve sleeve heat-sealed to said web in the manufacture of a further embodiment of a valved bag according to the invention.
Figure 17:
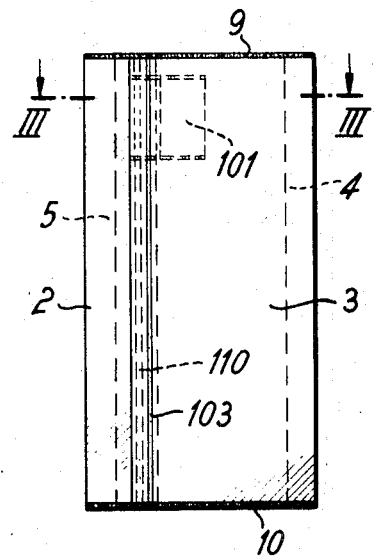
FIG. 17 is an elevation showing a gusseted and valved bag which has been made from a web section as shown in FIG. 16 in flattened condition.
Figure 18:
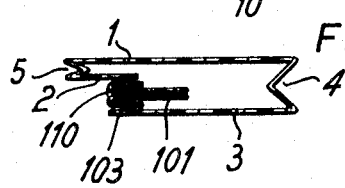
FIG. 18 is a sectional view taken on line III—III of FIG. 17.

The starting material used in the manufacture of the bag according to FIGS. 17 and 18 is a web 100 (FIG. 16) which consists of plastic material and has the desired width. As in the process which has been described hereinbefore, the web is continuously advanced, and finished valve sleeves are fed to the web and joined to the same by heat-sealing at points which are spaced by the bag length. In the illustrated embodiment, each valve sleeve consists of two patches of plastic material, which are superimposed and heat-sealed along two parallel sides before they are joined by heat-sealing to the web 100 of plastic material.

In the known bags and in the illustrative embodiments described hereinbefore, a longitudinal edge of the valve sleeve is in registry with the line where the transverse severance is subsequently effected. In the present embodiment, however, the corresponding longitudinal edge of the valve sleeve 101 is sufficiently spaced from the dash-dot line 102 where the transverse severance is to be effected. With this arrangement, the valve sleeve cannot protrude over the transverse parting line even when the valve sleeve is inserted with a large tolerance.

The heat-sealing of the valve sleeves to the web is effected in known manner by a hot extruded strip 103 of plastic material, which is continuously fed to the web 100. The present embodiment is a gusseted and valved bag. For this reason, FIG. 16 shows six dash-dot lines 104–109 where the web is subsequently folded.

When the valve sleeves have been heat-sealed to the web, the side portions of the web are turned over so that a tubular web is formed. That portion which extends to the left from line 104 is turned over first in forming the two-part tubing ply. That portion which extends to the right from line 109 is turned over last in forming this tubing ply. That portion of the web of plastic material which lies between lines 106 and 107 forms the one-part tubing ply, whereas the web portions disposed between lines 104 and 106, or 107 and 109, form the gussets. The edges of the side portions of the web overlap after these side portions have been turned over and are joined by heat-sealing by means of an extruded strip of plastic material, which is introduced in a hot state between said edges.

The valved bag which is shown in FIGS. 17 and 18 is formed from a section of the web 100 of plastic material, which web has previously been formed into a gusseted tubing. The longitudinal seam of the tubing forms also the longitudinal seam of the bags. This longitudinal seam is designated 110 in FIGS. 17 and 18.

The bag comprises a rear ply 1, which is formed by that portion of the web 100 which lies between lines 106 and 107. The bag comprises further a front ply, composed of the two portions 2 and 3, the two gussets 4 and 5, and the valve sleeve 101. The top and bottom ends of the bag are closed by heat-sealed transverse seams 9 and 10. As is apparent from FIG. 17, the valve sleeve 101 is arranged at the filling end of the bag with a spacing from the nearest heat-sealed transverse seam. This affords the above-mentioned advantages. The provision of heat-sealed flat seams at the top and bottom edges of the valve sleeves affords additional advantages, which have also been stated in the introductory part of the specification.

What is claimed is:

1. A process of manufacturing valve sleeves for valved bags which are open at both ends comprising the steps of: superimposing two webs of plastic material, originating on two separate supply rolls, folding over one edge of each of said webs to the outside and on the same side thereof to form a sleeve which, in part, is two ply at one end, joining said webs by wide heat-sealed seams which extend transversely to the longitudinal direction of the webs and are spaced apart by the desired sleeve width, and severing individual sleeves from the joined webs in the heat-sealed transverse seams.

2. Apparatus for manufacturing valve sleeves for a valved bag which are opened at both ends, said apparatus comprising: two supply rolls, each of which carries a single-ply web of plastic material; means to feed said webs from said rolls along a fixed path in a superimposed position; a heat-sealing device disposed in said path for forming wide heat-sealed transverse seams which join the two webs at evenly spaced points; means disposed in said path for effecting cutting operations in the heat-sealed transverse seams; and means for folding over one edge of each of said webs to the outside and one the same side thereof to form a sleeve which, in part, is two-ply at one end, said means being disposed in said path preceding the heat-sealing device.

3. Apparatus according to claim 2 wherein said heat-sealing device comprises a heat-sealing cylinder, a plurality of heat-sealing elements provided at the peripheral surface of said cylinder, extending transversely to the direction of rotation and spaced apart by the desired width of the valve sleeves, and an endless belt contacting said cylinder around a large part of its periphery and adapted to revolve at the same velocity as the periphery of the cylinder.

4. Apparatus according to claim 3 further comprising a plurality of time-limit relays each of which being adapted to control the operating time of the respective heat-sealing element, a first switch contact included in the energizing circuit of each of said time-limit relays, a first switch-operating member adapted to close said contacts for a short time during each revolution of said heat-sealing cylinder, said switch-operating member being adapted to revolve with said heat-sealing cylinder, a plurality of control relays each of which being adapted to control the energization of the respective heat-sealing element, a second switch contact operatively connected to each of said time-limit relays, said second contact being included in the energizing circuit of each of said control relays, a third switch contact included in the energizing circuit of each of said control relays, a second switch-operating member adapted to operate said third switch contacts and to rotate in unison with said heat-sealing cylinder, said second switch-operating member being angularly adjustable relative to said heat-sealing cylinder, and a locking circuit for each of said control relays, said locking circuit including said second switch contact.

5. Apparatus according to claim 4 further comprising a plurality of fixed contact-inducing means operatively associated with said second switch-operating member, said contact-inducing means being adjustable to vary the heat sealing time.

6. Apparatus according to claim 4 wherein said second switch-operating member is automatically adjustable in response to the temperature of the heat-sealing elements.

References Cited

UNITED STATES PATENTS

| | | | |
|---|---|---|---|
| 2,474,770 | 6/1949 | Yount et al. | 156—201 |
| 2,698,046 | 12/1954 | Finke | 156—200 |
| 2,622,055 | 12/1952 | Lieder | 156—269 |
| 2,680,471 | 6/1954 | Mercer | 156—583 |
| 2,998,340 | 8/1961 | Conway et al. | 156—250 |
| 3,172,796 | 3/1965 | Gulker | 156—269 |

DOUGLAS J. DRUMMOND, Primary Examiner

U.S. Cl. X.R.

156—269, 290, 461, 467